United States Patent [19]

Brown et al.

[11] Patent Number: 5,764,215

[45] Date of Patent: Jun. 9, 1998

[54] METHOD AND SYSTEM FOR GENERATING A GLOBAL HIT TEST DATA STRUCTURE USING SCAN LINE COMPRESSION OF WINDOWS IN A GRAPHICAL USER INTERFACE

[75] Inventors: Michael W. Brown, Coral Springs, Fla.; Kelvin Roderick Lawrence, Round Rock; Mark A. Sehorne, Austin, both of Tex.

[73] Assignee: International Business Machines Corporation, Armonk, N.Y.

[21] Appl. No.: 602,561

[22] Filed: Feb. 20, 1996

[51] Int. Cl.⁶ .................................................. G09G 5/00
[52] U.S. Cl. .................................. 345/118; 345/340
[58] Field of Search ............................ 345/118, 121, 345/112, 113, 114, 132, 202, 339, 340, 342, 343, 344, 345, 145, 146

[56] References Cited

U.S. PATENT DOCUMENTS

| | | |
|---|---|---|
| 4,586,035 | 4/1986 | Baker et al. . |
| 5,001,469 | 3/1991 | Pappas et al. . |
| 5,046,001 | 9/1991 | Barker et al. . |
| 5,050,105 | 9/1991 | Peters . |
| 5,091,969 | 2/1992 | Kuwashima . |
| 5,185,597 | 2/1993 | Pappas et al. . |
| 5,195,177 | 3/1993 | Kamiyama et al. ............... 345/118 |
| 5,226,117 | 7/1993 | Miklos . |
| 5,241,656 | 8/1993 | Loucks et al. . |
| 5,276,437 | 1/1994 | Horvath et al. ................... 345/118 |
| 5,298,890 | 3/1994 | Kanamaru et al. . |
| 5,377,317 | 12/1994 | Bates et al. . |
| 5,390,295 | 2/1995 | Bates et al. . |

*Primary Examiner*—Xiao Wu
*Attorney, Agent, or Firm*—Mark S. Walker; Brian F. Russell; Andrew J. Dillon

[57] ABSTRACT

A method and system for enhanced locator hit testing and region clipping of windows in a windowing environment of a data processing system is provided. A global hit test data structure is generated having a plurality of compressed scan line data sets that represent scan lines of a display. Each compressed scan line data set contains one or more vectors and a window identifier associated with each vector that describe the window ownership of one or more spans in an associated scan line of the display. A vector identifies a span of the associated scan line, and each window identifier identifies the window that owns the span identified by its associated vector. The enhanced locator hit testing of windows identifies the window that owns a selected pel of the display by accessing the compressed scan line data set that defines the window ownership of the selected pel, determining the vector that contains the selected pel, and retrieving the window identifier associated with the determined vector. The retrieved window identifier is the result of the enhanced locator hit test for the selected pel. The enhanced region clipping of windows performs region clipping by generating a bitmap image having a plurality of pels, each pel corresponding to a pel in the display, and for each pel of the bitmap image, accessing the scan line data set having the vector containing its corresponding pel. It is then determined if the window identifier associated with that vector containing the corresponding pel is a selected window identifier. The region clipping is completed by setting each corresponding pel of the display to the pel of the bitmap image for each pel where it is determined that the window identifier is not the selected window identifier.

24 Claims, 7 Drawing Sheets

METHOD AND SYSTEM FOR GENERATING A GLOBAL HIT TEST DATA STRUCTURE USING SCAN LINE COMPRESSION OF WINDOWS IN A GRAPHICAL USER INTERFACE

BACKGROUND OF THE INVENTION

1. Technical Field

The present invention relates in general to a method and system within a graphical user interface of a data processing system, and in particular to a method and system for generating a global hit test data structure of irregular shaped windows in a data processing system graphical user interface. Still more particularly, the present invention relates to a method and system for generating a global hit test data structure using scan line compression of irregular shaped windows in a data processing system graphical user interface to provide enhanced locator hit testing and region clipping the irregular shaped windows.

2. Description of the Related Art

The user interface for a personal computer defines how the user communicates with the computer. This communication link defines how applications are used, how tasks are switched, and how choices are made. Many modern computers provide a graphical user interface (GUI) to provide this communication link with the user. A graphical user interface is a type of display format that enables a user to choose commands, start programs, and see lists of files and other options by pointing to pictorial representations and lists of menu items on the screen. Choices can generally be activated either with a keyboard or with a mouse. By using a mouse to point to objects on a display, represented by small images (icons), a user controls the computer without knowing any complex commands. The mouse controlled graphical user interface allows the user to point to icons representing programs and data and to group those icons into window frames.

A windowing environment is an operating system or shell that presents a user with specially delineated areas of the screen called windows. Each window can act independently, as if it were a virtual display device. Windowing environments typically allow windows to be resized and moved around on the display. The Macintosh Finder, MS Windows, and the OS/2 Presentation Manager are all examples of windowing environments. In window-based programs, the screen can be divided into several windows, each of which has its own boundary and can contain a different document. Each window might also contain its own menu or other controls, and the user might be able to enlarge and shrink individual windows at will. In some programs, windows are open side by side on the screen; in others, open windows can overlap one another.

The windowing subsystems that generate and control the windowing environment traditionally store and display windows as a rectangle. The position of a particular window in the current display is defined by an origin point on the screen and the size of the window rectangle. Thus, in every known windowing subsystem, a window must be defined as a rectangle.

As a user moves a locator or pointer across the display, commonly called the "desktop", it moves from one window to the next. In most computers, the operating system provides a locator hit testing mechanism for determining which window the pointer is currently over. This locator hit testing is continuously performed. When a window gets a hit, as indicated by the locator hit test, the windowing system sends the window a locator or mouse event signal to indicate that the mouse is currently pointing on that window. The application which owns the indicated window then has the opportunity to provide the user feedback. Examples of such feedback are when graphics applications show the pointer as a cross hair, editors change it to a text pointer, and still other applications display a block of text describing what will happen if the user clicks on the current location. When the user does click on a particular region of a window, this mouse event is also sent to the window currently being hit by the mouse to allow the application owning the window to perform the requested function.

Because windows may overlap, the windowing subsystem generates a depth list indicating the relative "z-position" of each displayed window in what is called the windowing z-order. The depth list provides a third dimension for the windows to allow overlaying and clipping of the displayed windows by showing which windows are to be shown over and under others. Because applications and/or windows which are on top of other windows cover (clip) part or all of the windows below it, the locator hit testing becomes significantly more complex. Now, more than one window may be located in a particular region of the display, so the hit test code must do a top down z-order search of the depth list to find the first window having a hit at this region. This slow linear search significantly increases the time required to perform the locator hit test when the desktop is covered with a large number of windows.

A very similar problem occurs when an application draws to its own window. The drawing must be clipped by the windows overlaying it. An operating system's graphic subsystem will accomplish this task by using a clipping region list. This clipping region list defines rectangular areas within each displayed window that must be clipped to accommodate overlaying windows.

While some interfaces allow for irregular shaped windows to be displayed, these windows are still defined within rectangular shapes on the display. The irregular shaped window will "own" this rectangular region of the current display. Thus, a problem arises when a window overlapped by an irregular shaped window is pointed to at a point inside the rectangular region owned by the irregular shaped window, but not actually on the irregular shaped window. Because the locator hit test defines the irregular shaped window by the rectangular region, the irregular shaped window will receive the hit instead of the intended window underneath.

Consequently, due to the evolving nature of the desktop and how applications will be displayed, the implementation of irregularly shaped windows will generate an enormous amount of processor time using conventional techniques to correctly and accurately enable hit testing and clipping regions. It would be desirable to provide a windowing environment having high speed hit testing and region clipping for irregular shaped windows. This windowing environment would provide a method and system of doing hit testing and window clipping for irregular shaped windows without the debilitating overhead associated with thousands of clipping rectangles or by forcing the applications owning the irregular shaped windows to resolve the clipping regions themselves.

SUMMARY OF THE INVENTION

According to the present invention, a method and system for enhanced locator hit testing and region clipping of windows in a windowing environment of a data processing system is provided. For the hit testing and region clipping, a global hit test data structure is generated having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line. The enhanced locator hit testing of windows identifies the window that owns a selected pel of the display by accessing the compressed scan line data set within the global hit test data structure that defines the window ownership of the selected pel, determining the vector of the accessed compressed scan line data set that contains the selected pel, and retrieving the window identifier associated with the determined vector, wherein the retrieved window identifier is the result of the enhanced locator hit test for the selected pel. The enhanced region clipping of windows performs region clipping by generating a bitmap image having a plurality of pels, each pel corresponding to a pel in the display, and for each pel of the bitmap image, accessing the scan line data set having the vector containing its corresponding pel, and determining if the window identifier associated with that vector containing the corresponding pel is a selected window identifier. The region clipping is then completed by setting each corresponding pel of the display to the pel of the bitmap image for each pel of the bitmap image where it is determined that the window identifier is not the selected window identifier.

The above as well as additional objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
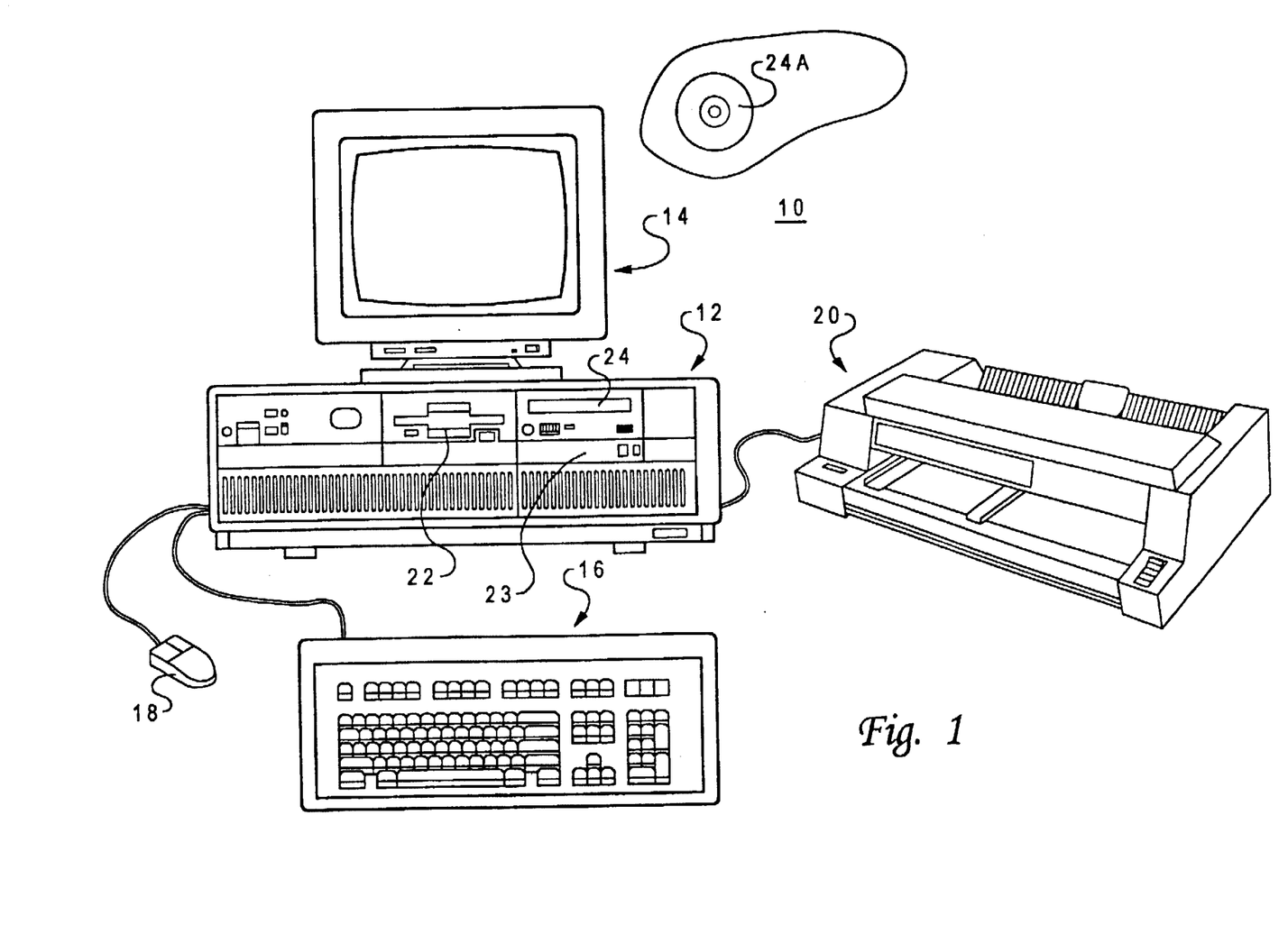
FIG. 1 illustrates a preferred embodiment of a data processing system which may be utilized to implement the present invention.

With reference now to the figures and in particular with reference to FIG. 1, there is illustrated a preferred embodiment of a data processing system which may be utilized to implement the present invention. As illustrated, data processing system 10 includes system unit 12, display device 14, keyboard 16, mouse 18, and printer 20. As is well-known in the art, system unit 12 receives data from input devices such as keyboard 16, mouse 18, or networking/telecommunication interfaces (not illustrated). Mouse 18 is preferably utilized in conjunction with a graphical user interface (GUI) in which system objects, including data processing system components and application programs, may be manipulated by mouse 18 through the selection and movement of associated graphical objects displayed within display device 14. To support storage and retrieval of data, system unit 12 further includes diskette drive 22, hard disk drive 23, and CD-ROM drive 24 all of which are connected to system unit 12 in a well-known manner. Those skilled in the art are aware that other conventional components can also be connected to system unit 12 for interaction therewith.

Figure 2:
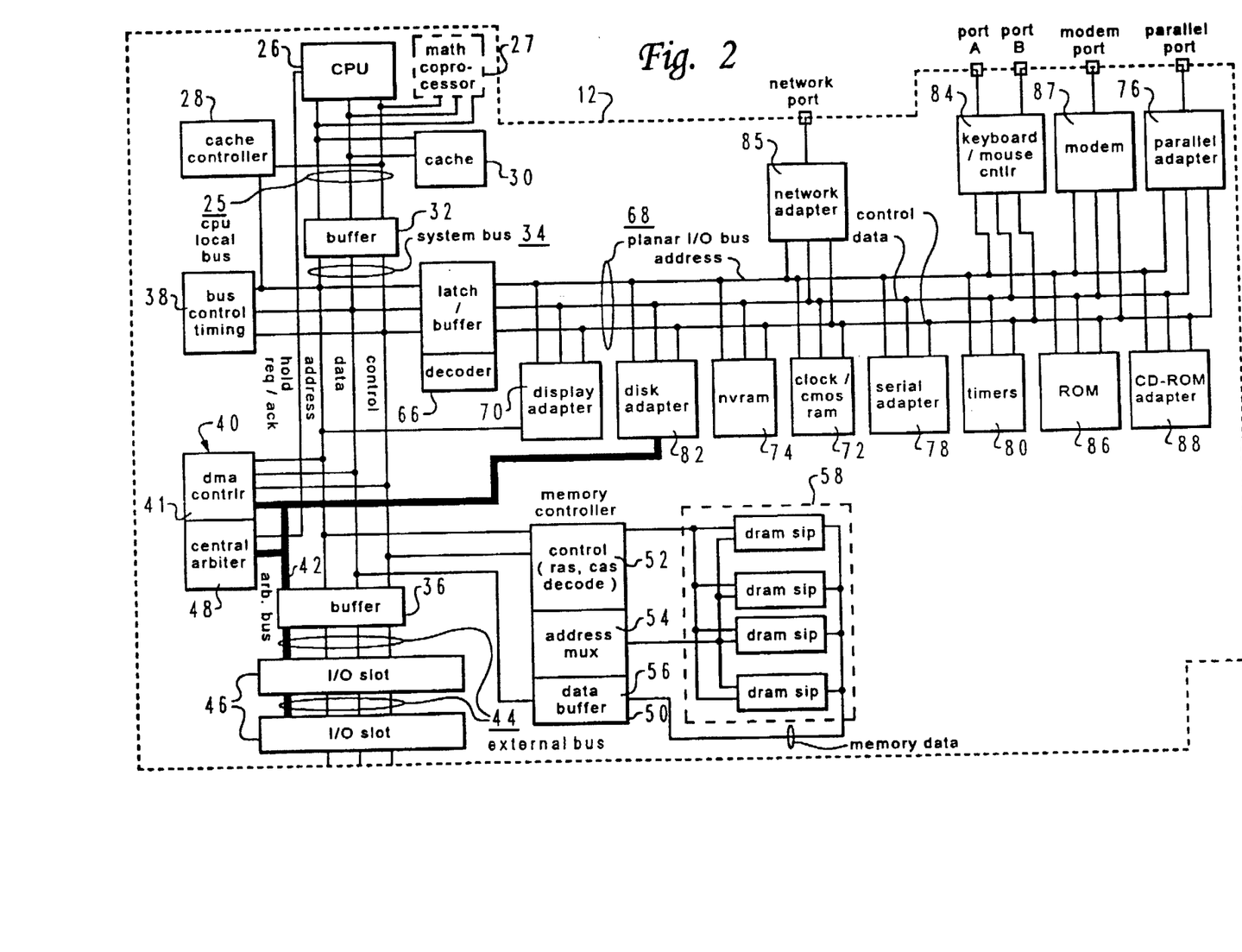
FIG. 2 depicts a block diagram of the principal components of the system unit in the data processing system in accordance with a preferred embodiment of the present invention.

Referring now to FIG. 2, there is depicted a block diagram of the principal components of system unit 12 in data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 could be implemented as one of the 80X86 line of microprocessors, which are available from a number of vendors.

In addition to CPU 26, an optional math coprocessor 27, cache controller 28, and cache memory 30 are coupled to a high-speed CPU local bus 25. Math coprocessor 27 is an optional processor, distinct from CPU 26, that performs numeric calculations with greater efficiency than CPU 26. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to Micro Channel bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56.

Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within secondary storage, such as hard disk drive 23, which is controlled by disk adapter 82.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and an optional feature bus such as Micro Channel bus 44. Connected to Micro Channel bus 44 are a number of I/O slots 46 for receiving Micro Channel adapter cards which may be further connected to an I/O device or memory. Arbitration control bus 42 couples DMA controller 41 and central arbiter 48 to I/O slots 46 and disk adapter 82. By implementing the Micro Channel architecture bus arbitration protocol, central arbiter 48 regulates access to Micro Channel bus 44 by extension cards, controllers, and CPU 26. In addition, central arbiter 44 arbitrates for ownership of Micro Channel bus 44 among the bus masters coupled to Micro Channel bus 44. Bus master support allows multiprocessor configurations of Micro Channel bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, network adapter 85, keyboard/mouse controller 84, modem 87 and parallel adapter 76. Display adapter 70 translates graphics data from CPU 26 into RGB video signals utilized to drive display device 14. Depending upon the operating system and application software running, the visual output may include text, graphics, animation, and multimedia video. Disk adapter 82 controls the storage of data to and the retrieval of data from hard disk drive 23 and diskette drive 22. Disk adapter 82 handles tasks such as positioning the read/write head and mediating between the drives and CPU 26. Non-volatile RAM 74 stores system configuration data that describes the present configuration of data processing system 10. For example, nonvolatile RAM 74 contains information that describes the capacity of hard disk drive 23 or a diskette placed within diskette drive 22, the type of display device 14, the amount of free RAM 58, and the present system configuration. These data are stored in non-volatile RAM when power is removed from data processing system 10.

Clock 72 is utilized by application programs executed by CPU 26 for time and day calculations. Serial adapter 76 provides a synchronous or asynchronous serial interface with external devices through a serial port (not shown), which enables data processing system 10 to transmit information to/from a serial communication device. Timers 80 comprise multiple interval timers which may be utilized to time a number of events within data processing system 10. As described above, timers 80 are among the devices directly controlled by some application programs, particularly games, which were written for a single-threaded operating system environment.

ROM 86 typically stores a basic input/output system (BIOS) which provides user-transparent I/O operations when CPU 26 is operating under the DOS operating system. BIOS also includes power on self-test (POST) diagnostic routines which perform system set-up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 controls the retrieval of data from CD-ROM drive 24, and CD-ROM 24A.

Parallel adapter 76 enables system unit 12 to output data in parallel to external devices such as printer 20 through a parallel port. Keyboard/mouse controller 84 interfaces system unit 12 with keyboard 16 and a pointing device, such as mouse 18. Such pointing devices are typically utilized to control an on-screen element, such as a graphical pointer that specifies the location of the pointer when the user presses a mouse button. Other pointing devices include a graphics tablet, stylus, light pen, joystick, puck, trackball, trackpad, and the pointing device sold by IBM under the trademark "TrackPoint".

Finally, system unit 12 includes network adapter 85 and modem 87, which facilitate communication between data processing system 10 and other data processing systems, including computer networks. Network adapter 85 is utilized to connect data processing system 10 to a computer network such as a local area network (LAN) connected to the network port. Computer networks support electronic transmission of data electronically over the network connection. Networks also support distributed processing, which enables data processing system 10 to share a task with other data processing systems linked to the network. Modem 87 provides modulation and demodulation of analog data communicated over a telecommunication line from and to a digital form. For example, a modem may be utilized to connect data processing system 10 to an on-line information service, such as the information service provided by Prodigy Services Corporation under the service mark "PRODIGY". Such on-line service providers offer software and data that can be downloaded into data processing system 10 via the modem. Furthermore, telephone communication through modem 87 provides a connection to other sources of software, such as a server, an electronic bulletin board, and the Internet or "World Wide Web".

As described in detail below, aspects of the present invention pertain to specific methods or functions implementable on computer systems. These aspects of the present invention may be implemented as a computer program product for use with a computer system. Those skilled in the art should readily appreciate that computer programs defining the functions of the present invention can be delivered to a computer in many forms, which include, but are not limited to: (a) information permanently stored on non-writable storage media (e.g. read only memory devices within a computer such as ROM 86 or CD-ROM disks readable by a computer I/O attachment such as CD-ROM drive 24); (b) information alterably stored on writable storage media (e.g., floppy disks within diskette drive 22 or hard disk drive 23); or (c) information conveyed to a computer through communication media, such as through a computer network attached to network adapter 85 or a telecommunication line attached to modem 87. It should be understood, therefore, that such media, when carrying computer readable instructions that direct the method-functions of the present invention, represent alternate embodiments of the present invention.

Figure 3:
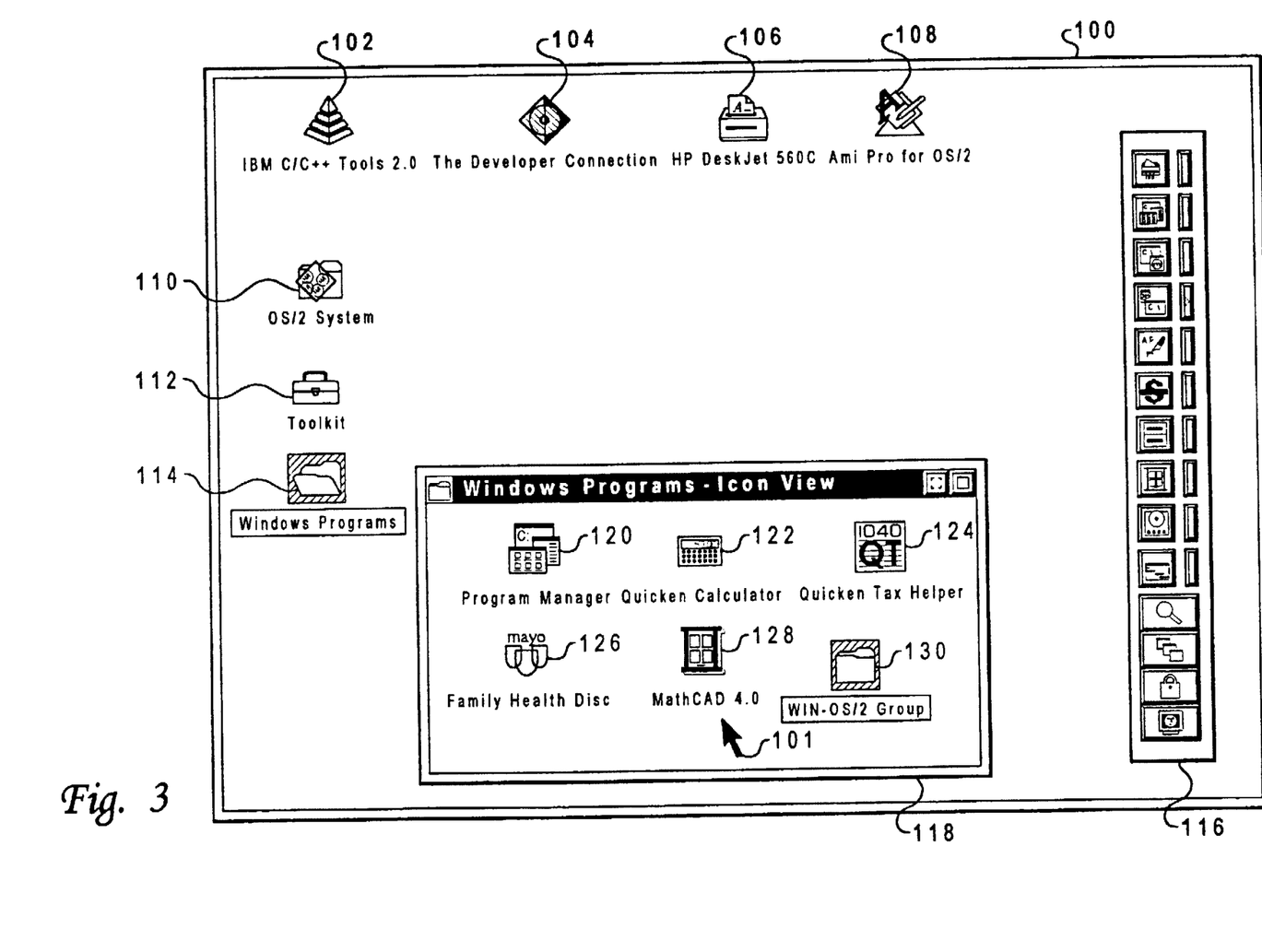
FIG. 3 depicts a standard graphical user interface employed by the data processing system's operating system in accordance with a preferred embodiment of the present invention.

Referring now to FIG. 3, there is depicted a standard GUI employed by the data processing system's operating system. Background desktop 100 displayed to a user within display device 14 includes a plurality of user-selectable icons 102–116. Each icon 102–116 represents an application, function or file storage area which a user can conveniently select utilizing graphical pointer 101 by double-clicking the left button of mouse 18. When a user selects one of icons 102–116, the function corresponding to the selected icon is activated and the selected icon is highlighted. Many of icons 102–116 have an associated window or series of windows which are displayed when the icon is selected. For example, as seen in FIG. 3, when Windows Programs icon 114 is selected, window 118 is displayed to the user to provide further possible selections (i.e., icons 121–130).

Figure 4:
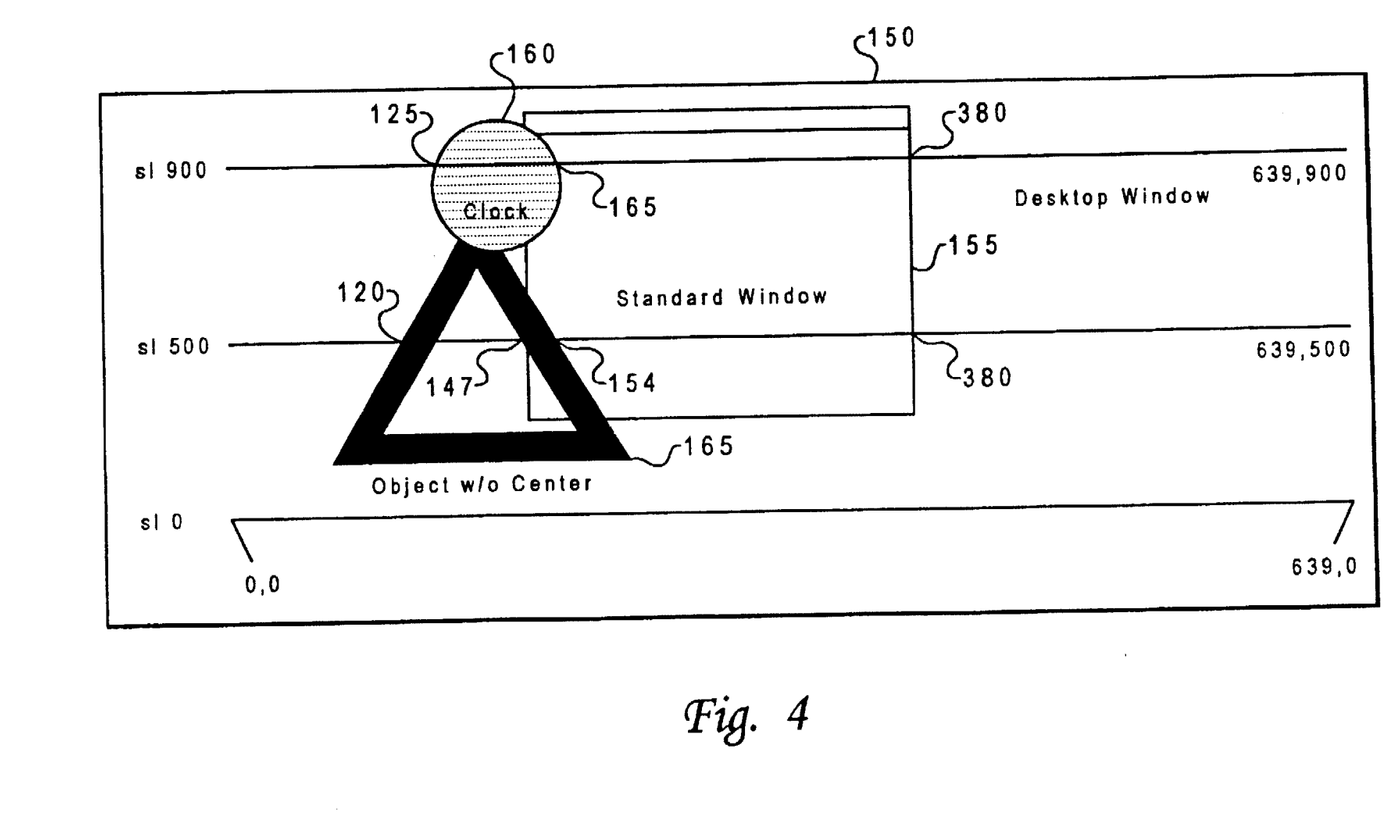
FIG. 4 shows a desktop displaying irregularly shaped windows in the windowing environment of the data processing system, in accordance with a preferred embodiment of the present invention.

Referring now to FIG. 4, there is shown a desktop 150 displaying irregularly shaped windows in the windowing environment of the data processing system, in accordance with a preferred embodiment of the present invention. The desktop window (dsk) 150 contains a standard window (sw) 155 and two irregular shaped windows, clock (clk) 160 and object (obj) 165.

As seen in FIG. 4, desktop 150 is generated on the display by a plurality of scan lines represented in graphics memory by a plurality of scan line data sets. For this example, desktop 150 has 1000 scan lines, three of which are graphically shown as sl0, sl500, sl900 in FIG. 4. In accordance with the present invention, the operating system generates a global hit test data structure in memory having a plurality of compressed scan line data sets that represent the scan lines on the current display of the windowing environment, in this case desktop 150. Each compressed scan line data set of the data structure contains one or more vectors and a window identifier associated with each vector that describe the window ownership of one or more spans in an associated scan line of the current display. A vector identifies a span of the associated scan line, and each window identifier identifies a window within the windowing environment that owns the span identified by its associated vector. As is understood by those skilled in the art, a span is a length of displayed pixels, typically horizontal, within a graphical image. In addition, as used herein, a span is one or more "pels" of a scan line, wherein a pel is the minimum number of pixels that may be resolved for selection by the graphical pointing device.

The global hit test data structure for the current display shown in FIG. 4 would contain a thousand compressed scan line data sets, one for each scan line. An example of three compressed scan line data sets for the current display's global hit test data structure would be:

sl0—(0 ... 639, dsk).
sl500—(0, 119, dsk), (120, 127,obj), (128, 146, dsk), (147, 154, obj), (155, 380, sw), (381, 639, dsk).
sl900=(0, 124, dsk), (125, 165, clk), (166, 380, sw), (381, 639, dsk).

Each compressed scan line data set contains at least one vector and a window identifier associated with each vector. For example, sl0 describes a single span by the vector <0, 639> pointing across the entire scan line from pel 0 to pel 639, and a window identifier, in this case "dsk", identifying every pel within the defined vector as being owned by the desktop window 150.

The compressed scan line data set for scan line sl500 defines the window of ownership for six spans that comprise the scan line. The first span in the scan line is defined by the vector <0, 119> (i.e. from pel 0 to pel 119) and is shown by the window identifier to be owned by the desktop. The second span of scan line sl500 is defined by the vector <120, 127> (i.e. from pel 120 to pel 127) and is shown by the window identifier to be owned by the object 165. The third span in the scan line is defined by the vector <128, 146> (i.e. from pel 128 to pel 146) and is shown by the window identifier to be owned by the desktop window 150. The next span within scan line sl500 is defined by the vector <147, 154> (i.e. from pel 147 to pel 154) and is identified by the window identifier as being owned by object 165. The fifth span in the scan line is defined by the vector <155, 380> (i.e. from pel 155 to pel 380) and is shown by the window identifier to be owned by the standard window 155. The last span within scan line sl500 is defined by the vector <381, 639> (i.e. from pel 381 to pel 639) and is identified by the window identifier as being owned by desktop 150.

The compressed scan line data set for scan line sl900 defines the window of ownership for four spans that comprise the scan line. The first span in the scan line is defined by the vector <0, 124> (i.e. from pel 0 to pel 124) and is shown by the window identifier to be owned by the desktop. The second span of scan line sl900 is defined by the vector <125, 165> (i.e. from pel 125 to pel 165) and is shown by the window identifier to be owned by the clock 160. The third span in the scan line is defined by the vector <166, 380> (i.e. from pel 166 to pel 380) and is shown by the window identifier to be owned by the standard window 155. The last span within scan line sl900 is defined by the vector <381, 639> (i.e. from pel 381 to pel 639) and is identified by the window identifier as being owned by desktop 150. In a similar manner, every scan line of the current display is compressed and stored in memory to form the global hit test data structure.

As will now be described, the global hit test data structure of the present invention enables a method and system for enhanced locator hit testing and region clipping of irregular shaped windows in a windowing environment of a data processing system. As will be appreciated, to generate the global hit test data structure, a run length encoded compression technique stores each window's scan lines for the display in a buffer. These buffers are then z-order sorted and resolved across the desktop. Then the windowing management subsystem has the ability to do an enhanced locator hit test and the video device driver subsystem has the ability to do an enhanced clipping region test on irregular shaped windows. Thus, it will be appreciated that the display of overlapping windows of all shapes and sizes on the desktop can be provided by the windowing environment, and not be limited to boxed windows as in other platforms. The present invention provides this unique ability to perform high performance locator hit tests and high performance clipping region tests without the performance penalties associated with prior art techniques.

Figure 5:
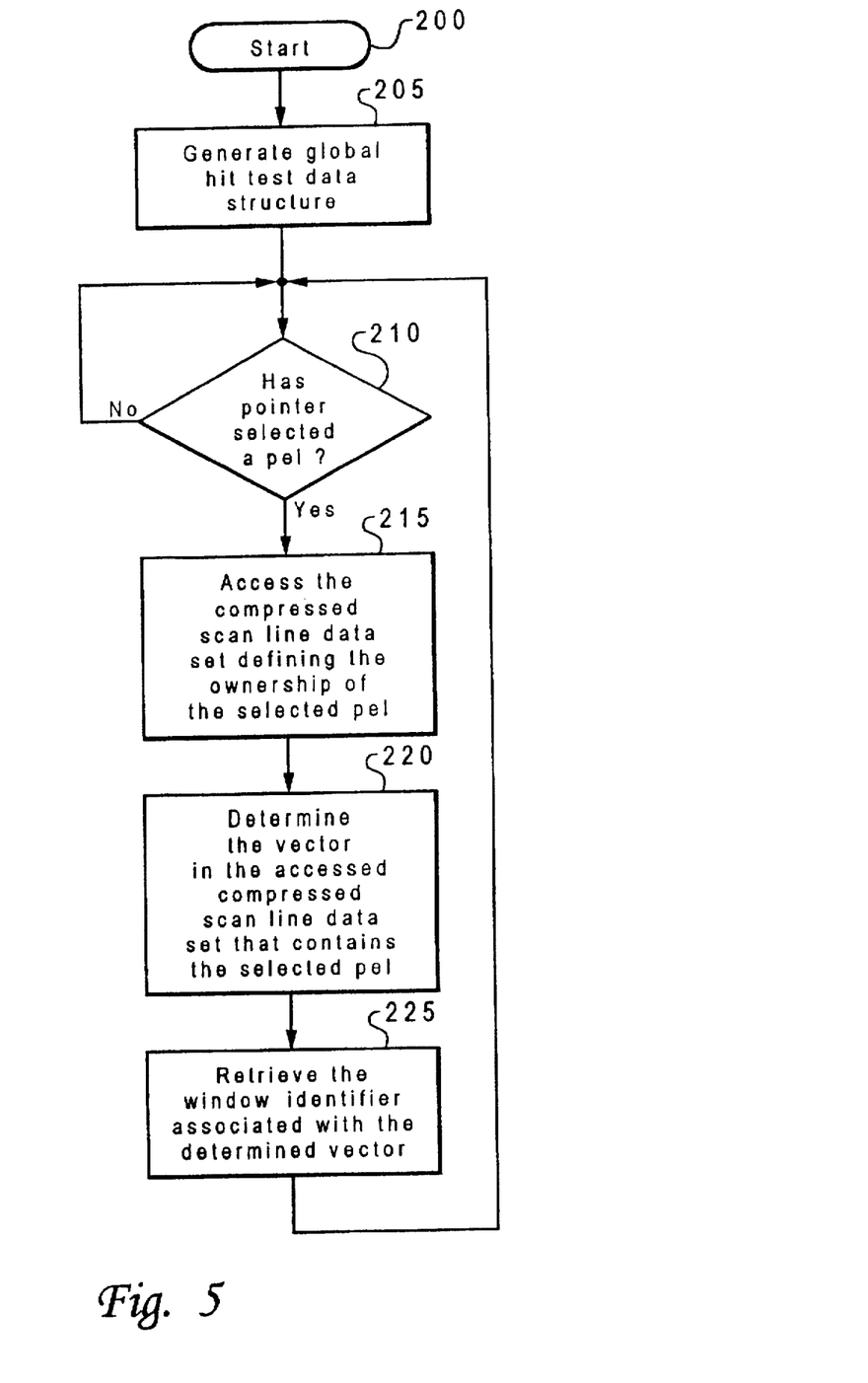
FIG. 5 shows a flow diagram of the method for enhanced locator hit testing of irregular shaped windows in a windowing environment, in accordance with a preferred embodiment of the present invention.

Referring now to FIG. 5, there is shown a flow diagram of the method for enhanced locator hit testing of irregular shaped windows in a windowing environment, in accordance with a preferred embodiment of the present invention. The method starts at step 200 and proceeds to step 205 where a global hit test data structure is generated for the current display of a windowing environment in the data processing system. The global hit test data structure comprises a plurality of compressed scan line data sets generated to represent the scan lines of the current display. Each compressed scan line data set represents one scan line of the current display and contains a vector and a window identifier associate with that vector for each span of the scan line. The vector identifies the span of the associated scan line by indicating the first and last pel within the span. The window identifier identifies the window owning that span.

The process then proceeds to decision block 210 where it is determined if a user has pointed to a particular pel or region of pels in the current display by utilizing a graphical pointing device. When the user selects a pel of the current display using the graphical pointer, the process proceeds to step 215 where the compressed scan line data set within the global hit test data structure that defines the ownership of a selected pel is accessed. The process proceeds to step 220 where it is determined which vector of the identified compressed scan line data set contains the selected pel. Thereafter, the process proceeds to step 225 where the window identifier associated with the determined vector is retrieved. The retrieved window identifier is the result of the enhanced locator hit test for the selected pel. Thereafter, the process returns to decision block 210 to await the user moving the graphical pointer to a new pel.

It will be appreciated that the present invention provides a process for high performance locator hit testing. With this process, a mouse click at a location (for example, (125x, 500y) in FIG. 4) would be resolved by accessing the global hit test data structure, accessing the corresponding compressed scan line data set, comparing the selected pel with the scan line data set vectors, and loading the window handle associated with the vector having a match with the selected pel. As will be appreciated, this process is significantly more efficient than the prior art process of sending the hit test to each window in z-order until one of them accepts the hit test. In a windowing environment where 20 or 30 windows are being displayed at once, that prior art locator hit test could potentially take 20 to 30 times longer than the present invention to perform.

Figure 6:
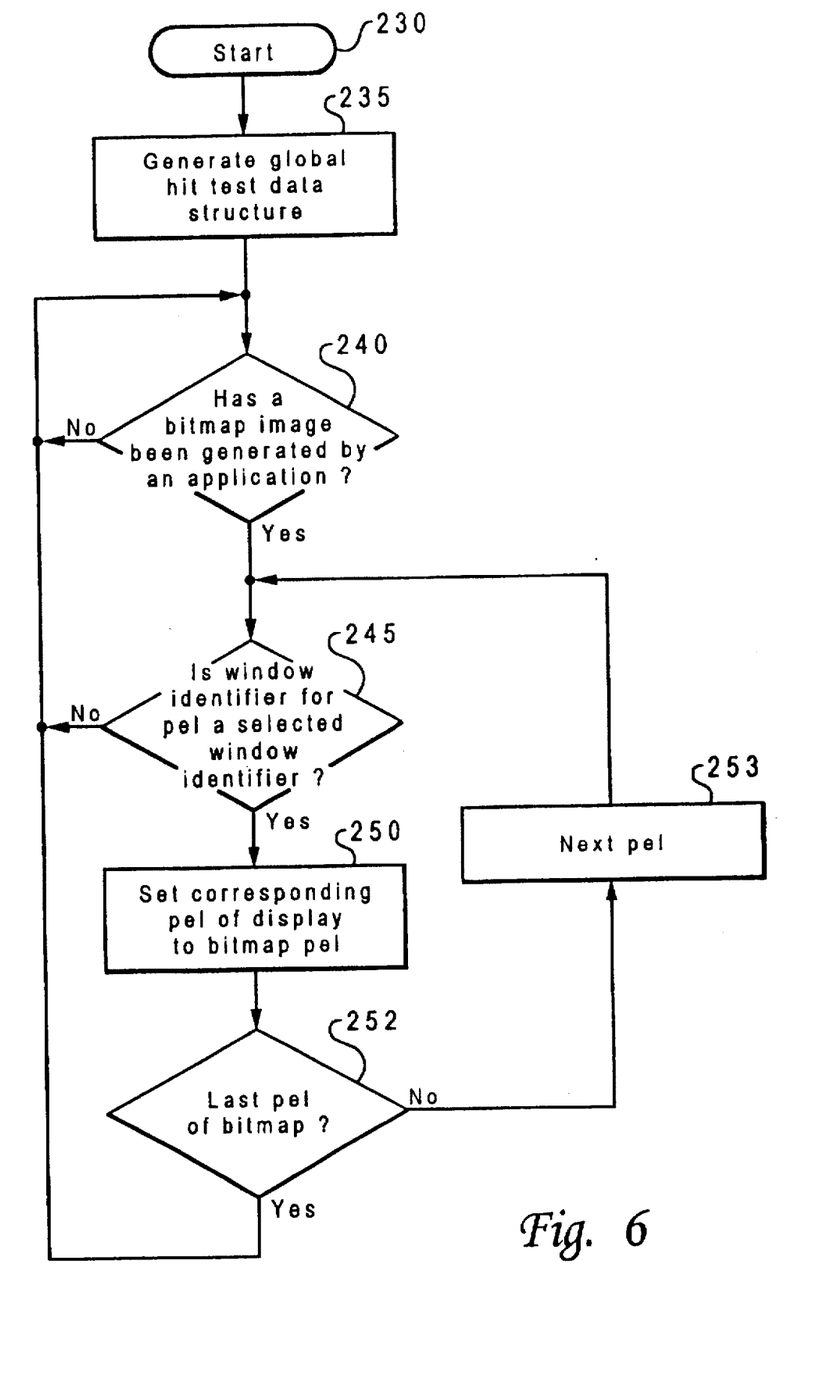
FIG. 6 shows a flow diagram of the method for enhanced region clipping of irregular shaped windows in a windowing environment, in accordance with a preferred embodiment of the present invention.

Referring now to FIG. 6, there is shown a flow diagram of the method for enhanced region clipping of irregular shaped windows in a windowing environment of a data processing system, in accordance with the preferred embodiment of the present invention. The process starts at step 230 and proceeds to step 235 where a global hit test data structure for the current display is generated.

The process then proceeds to decision block 240 where the process is held until a bitmap image is generated by an application owning a window within the current display. This bitmap image has a plurality of pels, and these pels have a screen position such that they correspond to the pels of the current display. Thus, if the entire bitmap image was to be displayed, each pel of the bitmap image would be output to its corresponding pel in the current display. After a bitmap image has been generated, the process proceeds to decision block 245 where it is determined whether the window identifier located in the global hit test data structure for a first pel of the bitmap image is the window owned by the displaying application. For each pel of the bitmap image, the scan line data set containing the window ownership data for that pel is accessed. The scan line data set will have the vector containing that pel's location in the current display. It is then determined if the window identifier associated with that vector identifies the window displaying the bitmap image.

If the determination is negative, the process returns to decision block 240 to await another bitmap image generation. If the pel is owned by the application's window, it can be displayed and the process proceeds to step 250 where the corresponding pel in the display is set to the bitmap image pel. Decision block 252 determines if the last pel of the bitmap has been tested at step 245. If not, the process proceeds to step 243 where the next pel of the bitmap image is selected and then returns to step 245. If the last pel of the bitmap has been tested, the process then returns to block 240 where to await another bitmap image being generated by an application. In this way, each pel of the bitmap image is saved in graphics memory at the corresponding pel of the current display, where it has been determined that the application owns that pel on the current display.

Figure 7:
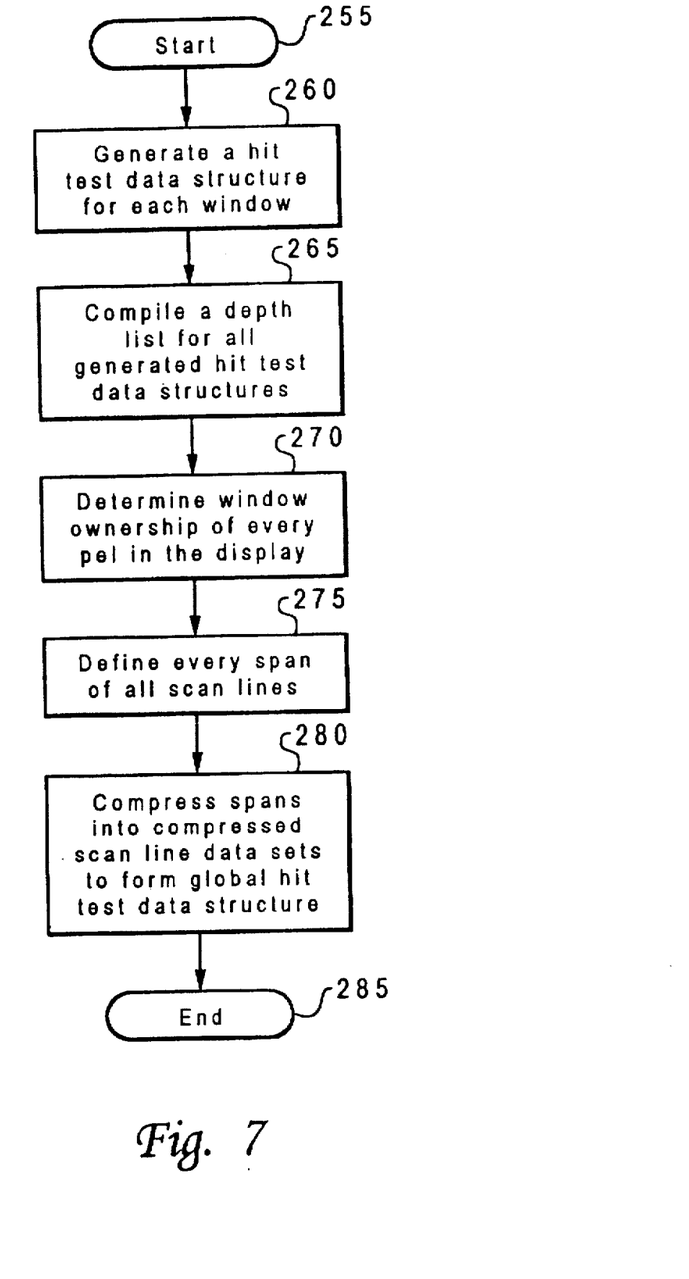
FIG. 7 shows a flow diagram of the process for generating a global hit test data structure, in accordance with a preferred embodiment of the present invention.

Referring now to FIG. 7, there is shown a flow diagram of a process for generating a global hit test data structure, in accordance with a preferred embodiment of the present invention. The process starts at step 255 and proceeds to step 260 where a hit test data structure is generated for each window in the windowing environment. Each hit test data structure represents the window ownership for each pel of the scan lines of only the associated window. Thus, each hit test data structure represents the window ownership of a display if only the associated window were being displayed. The process then proceeds to step 265 where a depth list is compiled in a z-order for the hit test data structures. As is well known, in a windowing environment having overlapping windows, each window has a z-position relative to the other windows on the current display that corresponds to the z-order of all windows in the windowing environment. This z-position provides a third dimension to each window, thereby indicating a hierarchy between the overlapping multiple windows.

The process then proceeds to step 270 where the window ownership of every pel of the current display is determined. This is done by accessing each hit test data structure in the z-order of the depth list to determine each window's location and current z-order. A pel is owned by the window with the highest z-position that is currently positioned at that pel. At step 275, the process then defines every span of all scan lines in the current display such that one or more pels owned by the same window form a span.

The process then proceeds to step 280 where the defined spans of the display scan lines are compressed into a plurality of compressed scan line data sets that represent the plurality of scan lines of the current display in the windowing environment. Each compressed scan line data set describes the window ownership of the one or more defined spans in the associated scan line of the current display. The data in a compressed scan line data set includes a vector and a window identifier of each span of the associated scan line. The vector identifies the span by including the first and last pel within the span of the scan line. The window identifier associated with the vector identifies the window that owns the identified span. The process then ends at step 285.

The plurality of compressed scan line data sets thus forms the global hit test data structure for the current display. The global hit test data structure provides a compressed scan line by scan line data structure containing the owning window handle for each point on each line of the desktop. For a simple rectangle, the data stored would represent scan line 0 to the height of the window owning column 0 to the width of the window. For a more complex shaped window, the bounding box for the entire shape is determined, providing the origin and extent of the window. Next, a list is generated containing the pels of each scan line that this window will actually draw on. This list can be generated as is done in existing complex region clipping code. The list is represented using simple vectors from the first pel of the span to the last pel of the span on the current scan line, thereby compressing the hit test data structure. If one or more adjacent scan line has the same "hit list", the scan lines can then be compressed across the Y dimension, providing even greater compression of the hit test data structure.

As an example of the present invention, consider the process for drawing clock 160 to the desktop in FIG. 4. The device driver for the application will access the global hit test data structure to do the clipping on the areas outside of the circle defining the clock, scan line by scan line, and will only send the windows bits to the graphics memory. As will be appreciated by those skilled in the art, this is much faster than exclusive-ORing in the existing bits not owned by the window and then filling in the bounding rectangle. Such a process would be even slower in cases where the bounding rectangle is large and the number of hits on a particular scan line is small.

As will be appreciated by those skilled in the art, a new global hit test data structure must be generated when a window in the windowing environment of the current display is moved, added or deleted. This is because the z-order of the windows may have changed and the ownership of individual pels within the current display may also have changed. Moreover, as will be appreciated, steps 205 and 235 are identical steps and do not have to be replicated if the processes of FIG. 5 and FIG. 6 are executed simultaneously. Similarly, when a new global hit test data structure is generated as a result of changes in the windowing environment, the processes of FIG. 5 and FIG. 6 are restarted at steps 200 and 230.

As will be appreciated, the present invention is an extremely fast and efficient way to resolve a window indicated by a locator or pointer, even if the desktop has multiple overlapping irregular shaped windows. Moreover, it will be appreciated that the performance of hit testing and region clipping using the invention is not affected by the irregular shaped windows, even if there are holes in some or all of the windows. There is no need for a bounding rectangle and therefore no limitation on the shapes or sizes of windows on the desktop. For example, one could create a single window which contains a grid of solid bars, place this window on top of all the windows on the desktop and still be able to select a window showing underneath but also between the bars of the grid window. Such functionality is nowhere shown in the prior art and has significant utility to users and designers of graphical user interfaces. In addition, the present invention provides an extremely fast and efficient method for performing window clipping of drawings sent to irregular shaped windows on a display device or printer which receives its data via scan line information. Specific implementations of display drivers can use the data to minimize the number of pels which must be updated on the screen, thereby maximizing the transfer rate and increasing the performance when displaying non-rectangular windows.

While the invention has been particularly shown and described with reference to a preferred embodiment, it will be understood by those skilled in the art that various changes in form and detail may be made therein without departing from the spirit and scope of the invention.

What is claimed is:

1. A method for enhanced locator hit testing of windows in a windowing environment of a data processing system, the method comprising the steps of:

generating a global hit test data structure having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line; and identifying the window that owns a selected pel of the display, including the steps of:
  accessing the compressed scan line data set within the global hit test data structure that defines the window ownership of the selected pel;
  determining the vector of the accessed compressed scan line data set that contains the selected pel; and
  retrieving the window identifier associated with the determined vector, wherein the retrieved window identifier is the result of the enhanced locator hit test for the selected pel.

2. A method for enhanced locator hit testing of windows in a windowing environment of a data processing system according to claim 1, wherein a plurality of windows are in the windowing environment, and wherein the step of generating a global hit test data structure comprises:

generating a global hit test data structure having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line;
generating a bitmap image having a plurality of pels, each pel corresponding to a pel in the display;
for each pel of the bitmap image, accessing the scan line data set having the vector containing its corresponding pel, and determining if the window identifier associated with that vector containing the corresponding pel is a selected window identifier; and
setting each corresponding pel of the display to the pel of the bitmap image for each pel of the bitmap image where it is determined that the window identifier is not the selected window identifier.

3. A method for enhanced locator hit testing of windows in a windowing environment of a data processing system according to claim 1, further comprising generating a new global hit test data structure when a window in the windowing environment is moved, added or deleted in the display.

4. A method for enhanced locator hit testing of windows in a windowing environment of a data processing system according to claim 1, wherein a window in the windowing environment is an irregular shaped window such that it is not a rectangular shaped window, and wherein the global hit test data structure has a plurality of compressed scan line data sets that represent a plurality of scan lines that display the irregular shaped window.

5. A method for enhanced region clipping of windows in a windowing environment of a data processing system, the method comprising the steps of:

generating a global hit test data structure having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line;

generating a bitmap image having a plurality of pels, each pel corresponding to a pel in the display;

for each pel of the bitmap image, accessing the scan line data set having the vector containing its corresponding pel, and determining if the window identifier associated with that vector containing the corresponding pel is a selected window identifier; and setting each corresponding pel of the display to the pel of the bitmap image for each pel of the bitmap image where it is determined that the window identifier is not the selected window identifier.

6. A method for enhanced region clipping of windows in a windowing environment of a data processing system according to claim 5, wherein a plurality of windows are in the windowing environment, and wherein the step of generating a global hit test data structure comprises the steps of:

generating a hit test data structure for each window in the windowing environment, wherein each hit test data structure represents the window ownership of only the associated window for each pel of the scan lines;

compiling a depth list in a z-order for the hit test data structures, wherein each window has a z-position relative to other windows on the display that corresponds to the z-order of all windows in the windowing environment;

determining the window ownership of every pel of the display by accessing each hit test data structure in the z-order of the depth list, wherein a pel is owned by the window with the highest z-position that has a hit test data structure indicating ownership of that pel;

defining every span of all scan lines of the display such that one or more pels owned by the same window form a span; and compressing defined spans into a plurality of compressed scan line data sets that represent the plurality of scan lines of the display in the windowing environment, wherein each compressed scan line data set of the plurality of compressed scan line data sets describes the window ownership of one or more defined spans in an associated scan line of the display, and contains one or more vectors and a window identifier associated with each vector, wherein a vector identifies a span of the associated scan line, and each window identifier identifies a window that owns the identified span of its associated vector.

7. A method for enhanced region clipping of windows in a windowing environment of a data processing system according to claim 5, further comprising generating a new global hit test data structure when a window in the windowing environment is moved, added or deleted in the display.

8. A method for enhanced region clipping of windows in a windowing environment of a data processing system according to claim 5, wherein a window in the windowing environment is an irregular shaped window such that it is not a rectangular shaped window, and wherein the global hit test data structure has a plurality of compressed scan line data sets that represent a plurality of scan lines that display the irregular shaped window.

9. A data processing system for enhanced locator hit testing of windows in a windowing environment, comprising:

means for generating a global hit test data structure having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line; and means for identifying the window that owns a selected pel of the display, including the means for:

accessing the compressed scan line data set within the global hit test data structure that defines the window ownership of the selected pel;

determining the vector of the accessed compressed scan line data set that contains the selected pel; and retrieving the window identifier associated with the determined vector, wherein the retrieved window identifier is the result of the enhanced locator hit test for the selected pel.

10. A data processing system for enhanced locator hit testing of windows in a windowing environment according to claim 9, wherein a plurality of windows are in the windowing environment, and wherein the means for generating a global hit test data structure comprises:

means for generating a global hit test data structure having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line;

means for generating a bitmap image having a plurality of pels, each pel corresponding to a pel in the display;

means for accessing the scan line data set having the vector containing its corresponding pel, for each pel of the bitmap image, and determining if the window identifier associated with that vector containing the corresponding pel is a selected window identifier; and means for setting each corresponding pel of the display to the pel of the bitmap image for each pel of the bitmap image where it is determined that the window identifier is not the selected window identifier.

11. A data processing system for enhanced locator hit testing of windows in a windowing environment according to claim 9, further comprising means for generating a new global hit test data structure when a window in the windowing environment is moved, added or deleted in the display.

12. A data processing system for enhanced locator hit testing of windows in a windowing environment according to claim 9, wherein a window in the windowing environment is an irregular shaped window such that it is not a rectangular shaped window, and wherein the global hit test data structure has a plurality of compressed scan line data sets that represent a plurality of scan lines that display the irregular shaped window.

13. A data processing system for enhanced region clipping of windows in a windowing environment, comprising:

means for generating a global hit test data structure having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line;

means for generating a bitmap image having a plurality of pels, each pel corresponding to a pel in the display;

means for accessing the scan line data set having the vector containing its corresponding pel, for each pel of the bitmap image, and determining if the window identifier associated with that vector containing the corresponding pel is a selected window identifier; and means for setting each corresponding pel of the display to the pel of the bitmap image for each pel of the bitmap image where it is determined that the window identifier is not the selected window identifier.

14. A data processing system for enhanced region clipping of windows in a windowing environment according to claim 13, wherein a plurality of windows are in the windowing environment, and wherein the means for generating a global hit test data structure comprises:

means for generating a hit test data structure for each window in the windowing environment, wherein each hit test data structure represents the window ownership of only the associated window for each pel of the scan lines;

means for compiling a depth list in a z-order for the hit test data structures, wherein each window has a z-position relative to other windows on the display that corresponds to the z-order of all windows in the windowing environment;

means for determining the window ownership of every pel of the display by accessing each hit test data structure in the z-order of the depth list, wherein a pel is owned by the window with the highest z-position that has a hit test data structure indicating ownership of that pel;

means for defining every span of all scan lines of the display such that one or more pels owned by the same window form a span; and means for compressing defined spans into a plurality of compressed scan line data sets that represent the plurality of scan lines of the display in the windowing environment, wherein each compressed scan line data set of the plurality of compressed scan line data sets describes the window ownership of one or more defined spans in an associated scan line of the display, and contains one or more vectors and a window identifier associated with each vector, wherein a vector identifies a span of the associated scan line, and each window identifier identifies a window that owns the identified span of its associated vector.

15. A data processing system for enhanced region clipping of windows in a windowing environment according to claim 13, further comprising means for generating a new global hit test data structure when a window in the windowing environment is moved, added or deleted in the display.

16. A data processing system for enhanced region clipping of windows in a windowing environment according to claim 13, wherein a window in the windowing environment is an irregular shaped window such that it is not a rectangular shaped window, and wherein the global hit test data structure has a plurality of compressed scan line data sets that represent a plurality of scan lines that display the irregular shaped window.

17. A computer program product for enhanced locator hit testing of windows in a windowing environment of a data processing system, comprising:

a computer usable medium having computer readable program code means embodied in the medium for customizing any user selected color bitmap image for a graphic user interface, the computer program product having:

computer readable program code means for generating a global hit test data structure having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line; and computer readable program code means for identifying the window that owns a selected pel of the display, including the means for:

accessing the compressed scan line data set within the global hit test data structure that defines the window ownership of the selected pel;

determining the vector of the accessed compressed scan line data set that contains the selected pel; and retrieving the window identifier associated with the determined vector, wherein the retrieved window identifier is the result of the enhanced locator hit test for the selected pel.

18. A computer program product for enhanced locator hit testing of windows in a windowing environment of a data processing system according to claim 17, wherein a plurality of windows are in the windowing environment, and wherein the computer readable program code means for generating a global hit test data structure comprises means for:

generating a global hit test data structure having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line;

generating a bitmap image having a plurality of pels, each pel corresponding to a pel in the display;

for each pel of the bitmap image, accessing the scan line data set having the vector containing its corresponding pel, and determining if the window identifier associated with that vector containing the corresponding pel is a selected window identifier; and setting each corresponding pel of the display to the pel of the bitmap image for each pel of the bitmap image where it is determined that the window identifier is not the selected window identifier.

19. A computer program product for enhanced locator hit testing of windows in a windowing environment of a data processing system according to claim 17, further comprising computer readable program code means for generating a new global hit test data structure when a window in the windowing environment is moved, added or deleted in the display.

20. A computer program product for enhanced locator hit testing of windows in a windowing environment of a data processing system according to claim 17, wherein a window in the windowing environment is an irregular shaped window such that it is not a rectangular shaped window, and wherein the global hit test data structure has a plurality of compressed scan line data sets that represent a plurality of scan lines that display the irregular shaped window.

21. A computer program product for enhanced region clipping of windows in a windowing environment of a data processing system, comprising:

a computer usable medium having computer readable program code means embodied in the medium for customizing any user selected color bitmap image for a graphic user interface, the computer program product having:

computer readable program code means for generating a global hit test data structure having a plurality of compressed scan line data sets that represent a plurality of scan lines for a display of the windowing environment in the data processing system, wherein each compressed scan line data set of the plurality of compressed scan line data sets contains one or more vectors and a window identifier associated with each vector that describe the window ownership of one or more spans in an associated scan line of the display, wherein a vector identifies a span of the associated scan line, and each window identifier identifies a window that owns the span identified by its associated vector, and wherein a span is one or more pels of a scan line;

computer readable program code means for generating a bitmap image having a plurality of pels, each pel corresponding to a pel in the display;

computer readable program code means for accessing the scan line data set having the vector containing its corresponding pel, for each pel of the bitmap image, and determining if the window identifier associated with that vector containing the corresponding pel is a selected window identifier; and computer readable program code means for setting each corresponding pel of the display to the pel of the bitmap image for each pel of the bitmap image where it is determined that the window identifier is not the selected window identifier.

22. A computer program product for enhanced region clipping of windows in a windowing environment of a data processing system according to claim 21, wherein a plurality of windows are in the windowing environment, and wherein the computer readable program code means for generating a global hit test data structure comprises the computer readable program code means for:

generating a hit test data structure for each window in the windowing environment, wherein each hit test data structure represents the window ownership of only the associated window for each pel of the scan lines;

compiling a depth list in a z-order for the hit test data structures, wherein each window has a z-position relative to other windows on the display that corresponds to the z-order of all windows in the windowing environment;

determining the window ownership of every pel of the display by accessing each hit test data structure in the z-order of the depth list, wherein a pel is owned by the window with the highest z-position that has a hit test data structure indicating ownership of that pel;

defining every span of all scan lines of the display such that one or more pels owned by the same window form a span; and compressing defined spans into a plurality of compressed scan line data sets that represent the plurality of scan lines of the display in the windowing environment, wherein each compressed scan line data set of the plurality of compressed scan line data sets describes the window ownership of one or more defined spans in an associated scan line of the display, and contains one or more vectors and a window identifier associated with each vector, wherein a vector identifies a span of the associated scan line, and each window identifier identifies a window that owns the identified span of its associated vector.

23. A computer program product for enhanced region clipping of windows in a windowing environment of a data processing system according to claim 21, further comprising computer readable program code means for generating a new global hit test data structure when a window in the windowing environment is moved, added or deleted in the display.

24. A computer program product for enhanced region clipping of windows in a windowing environment of a data processing system according to claim 21, wherein a window in the windowing environment is an irregular shaped window such that it is not a rectangular shaped window, and wherein the global hit test data structure has a plurality of compressed scan line data sets that represent a plurality of scan lines that display the irregular shaped window.

* * * * *